(12) United States Patent
You et al.

(10) Patent No.: US 12,355,044 B2
(45) Date of Patent: Jul. 8, 2025

(54) BATTERY MODULE COMPRISING METAL PARTICLE-DISPERSED THERMAL CONDUCTIVE RESIN AND METHOD AND SYSTEM FOR INSPECTING SAME

(71) Applicant: LG Energy Solution, Ltd., Seoul (KR)

(72) Inventors: Jung Been You, Daejeon (KR); Young Bum Cho, Daejeon (KR); Jin Hak Kong, Daejeon (KR); Jae Uk Ryu, Daejeon (KR); Min Ho Kwon, Daejeon (KR); Seung Joon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 615 days.

(21) Appl. No.: 17/634,856

(22) PCT Filed: Nov. 2, 2020

(86) PCT No.: PCT/KR2020/015105
§ 371 (c)(1),
(2) Date: Feb. 11, 2022

(87) PCT Pub. No.: WO2021/101121
PCT Pub. Date: May 27, 2021

(65) Prior Publication Data
US 2022/0328899 A1    Oct. 13, 2022

(30) Foreign Application Priority Data

Nov. 19, 2019 (KR) ........................ 10-2019-0148374

(51) Int. Cl.
*H01M 10/653* (2014.01)
*G01N 23/083* (2018.01)
(Continued)

(52) U.S. Cl.
CPC ........ *H01M 10/653* (2015.04); *G01N 23/083* (2013.01); *H01M 10/052* (2013.01);
(Continued)

(58) Field of Classification Search
CPC .. H01M 10/60; H01M 10/613; G01N 23/083; G01N 2223/00; G01N 2223/04; G01N 2223/041
See application file for complete search history.

(56) References Cited

U.S. PATENT DOCUMENTS 6,480,002 B1    11/2002  Jung et al.
8,781,065 B2 *   7/2014  Taylor .................. G01N 15/088
                                                    378/51
(Continued)

FOREIGN PATENT DOCUMENTS

CN        1512898 A      7/2004
CN      110431710 A     11/2019
(Continued)

OTHER PUBLICATIONS

Singhal et al, Swift Heavy Ion Irradiation as a Tool for Homogeneous Dispersion of Nanographite Platelets within the Polymer Matrices: Toward Tailoring the Properties of PEDOT:PSS/ Nanographite Nanocomposites, Journal of Physical Chemistry, 8, 120, 3403-3413 (2016) (Year: 2016).*

(Continued)

*Primary Examiner* — Amanda C. Walke
(74) *Attorney, Agent, or Firm* — Morgan, Lewis & Bockius LLP

(57) ABSTRACT

The present invention relates to a battery module comprising a particulate metal-dispersed thermal conductive resin, and a method and a system for inspecting same. The present invention can effectively inspect the degree of dispersion in the resin in a nondestructive manner and can detect a defect.

13 Claims, 2 Drawing Sheets

(51) Int. Cl.
  *H01M 10/052* (2010.01)
  *H01M 10/42* (2006.01)
  *H01M 10/647* (2014.01)
  *H01M 10/655* (2014.01)
  *H01M 50/211* (2021.01)

(52) U.S. Cl.
  CPC ..... *H01M 10/4285* (2013.01); *H01M 10/647* (2015.04); *H01M 10/655* (2015.04); *H01M 50/211* (2021.01); *G01N 2223/04* (2013.01); *G01N 2223/20* (2013.01); *G01N 2223/61* (2013.01)

(56) References Cited

U.S. PATENT DOCUMENTS

| | | | |
|---|---|---|---|
| 9,976,964 B2 * | 5/2018 | Fisset | G01N 23/083 |
| 2010/0310911 A1 | 12/2010 | Yamamoto et al. | |
| 2017/0077561 A1 | 3/2017 | Fukuda et al. | |
| 2017/0288278 A1 | 10/2017 | Ming et al. | |
| 2018/0205048 A1 | 7/2018 | Enomoto et al. | |
| 2019/0051954 A1 | 2/2019 | Kim et al. | |
| 2021/0028414 A1 | 1/2021 | Cho et al. | |

FOREIGN PATENT DOCUMENTS

| | | | | |
|---|---|---|---|---|
| EP | 1858107 A1 | 11/2007 | | |
| EP | 3225672 A1 | 10/2017 | | |
| EP | 3264492 A1 | 1/2018 | | |
| EP | 4047344 A1 * | 8/2022 | | G01N 23/046 |
| GB | 2560039 A | 8/2018 | | |
| JP | H08-162078 A | 6/1996 | | |
| JP | 2002-008638 A | 1/2002 | | |
| JP | 3270644 B2 | 4/2002 | | |
| JP | 2007154159 A * | 6/2007 | | G02B 1/04 |
| JP | 2008-293863 A | 12/2008 | | |
| JP | 2014-086342 A | 5/2014 | | |
| JP | 2014-103123 A | 6/2014 | | |
| JP | 2017-054766 A | 3/2017 | | |
| JP | 2017-186498 A | 10/2017 | | |
| JP | 2018-116805 A | 7/2018 | | |
| JP | 6631526 B2 | 1/2020 | | |
| KR | 2002-0085266 A | 11/2002 | | |
| KR | 10-2009-0123633 A | 12/2009 | | |
| KR | 10-1456228 B1 | 10/2014 | | |
| KR | 10-1470072 B1 | 12/2014 | | |
| KR | 10-2015-0018665 A | 2/2015 | | |
| KR | 10-1673544 B1 | 11/2016 | | |
| KR | 10-1676407 B1 | 11/2016 | | |
| KR | 10-1707220 B1 | 2/2017 | | |
| KR | 10-2018-0084539 A | 7/2018 | | |
| KR | 10-2006412 B1 | 8/2019 | | |
| KR | 10-2019-0122450 A | 10/2019 | | |

OTHER PUBLICATIONS

Kim et al, Structural Development of Nanoparticle Dispersion during Drying in Polymer Nanocomposite Films, Macromolecules, 49, 9608-9079, (2016). (Year: 2016).*

Mohan et al., Development of Novel Highly Conductive 3D Printable Hybrid Polymer-Graphene Composites, Materials Today, 17, 554-561, (2018). (Year: 2018).*

Nazarzadeh et al,, Synthesis and Characterization of Conductive Nanoblends Based on Poly(aniline-co-3-aminobenzoic acid) in the Presence of Poly(styrene-alt-maleic acid), Journal of Applied Polymer Science, vol. 122, 97-104 (2011). (Year: 2011).*

Extended European Search Report dated Jan. 15, 2024 issued in European Patent Application No. 20891068.7.

International Search Report issued in corresponding International Patent Application No. PCT/KR2020/015105 dated Feb. 10, 2021.

Supova et al., "Effect of Nanofillers Dispersion in Polymer Matrices: A Review," Science of Advanced Materials, 3 (1): 1-25 (2011).

Breda et al., "Preparation and Properties of metal-containing polyamide hybrid composites via reactive microencapsulation," Journal of Materials Science, 51: 10534-10554 (2016).

Chinese Office Action issued Sep. 21, 2023 for counterpart Chinese Patent Application No. 202080057009.X.

Office Action dated Jun. 5, 2024 issued in Chinese Patent Application No. 202080057009.X.

Office Action dated Oct. 2, 2024 issued in Korean Patent Application No. 10-2019-0148374.

* cited by examiner

[FIG. 1]
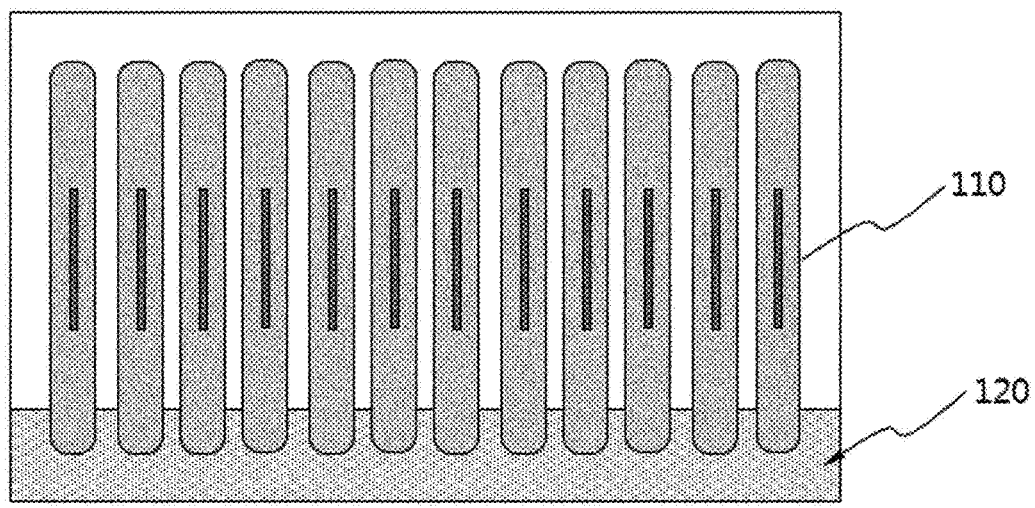

[FIG. 2]
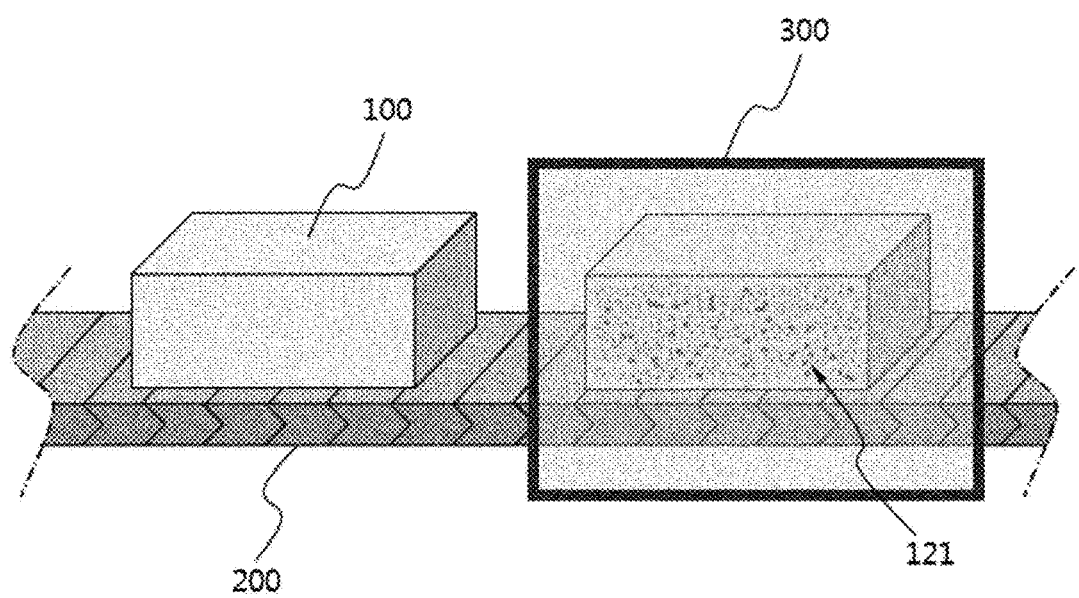

BATTERY MODULE COMPRISING METAL PARTICLE-DISPERSED THERMAL CONDUCTIVE RESIN AND METHOD AND SYSTEM FOR INSPECTING SAME

TECHNICAL FIELD

The present invention relates to a battery module including a thermally conductive resin in which metal particles are dispersed, a method and a system for inspecting the same.

This application claims the benefit of priority based on Korean Patent Application No. 10-2019-0148374, filed on Nov. 19, 2019, and the entire contents of the Korean patent application are incorporated herein by reference.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

However, in order to implement a high-output battery, there is a need for an element that effectively dissipates heat generated from the battery during charging and discharging. If the battery does not sufficiently dissipate heat, the risk of deterioration or ignition of the battery increases.

In the case of a battery module or battery pack including a plurality of batteries, a heat sink or the like may be provided or a resin having excellent thermal conductivity may be applied to dissipate heat generated during the charging/discharging process of the battery. In the case of applying a thermally conductive resin for heat dissipation, there is an advantage in that design freedom is excellent, but an inspection of whether the resin is evenly dispersed in the battery module is required.

In the past, CT (Computerized Tomography) equipment was used to confirm this, or a method of disassembling and inspecting some of the manufactured battery modules was adopted. However, the method of using CT equipment has limitations in that the equipment is expensive and the resolution is poor. Further, the method of disassembling the battery module has limitations in that it is impossible to perform full inspection and increases the inspection cost and time since the battery module should be destroyed.

DISCLOSURE

Technical Problem

The present invention was invented in consideration of the above problems, and an object of the present invention is to provide a battery module including a thermally conductive resin in which metal particles are dispersed, a method and a system for inspecting the same.

Technical Solution

In one example, a battery module according to the present invention includes: at least one battery cell; a module case in which the battery cell is accommodated; and a thermally conductive resin accommodated in the module case to allow the battery cells to be partially impregnated, wherein the thermally conductive resin contains particulate metal dispersed in a resin matrix.

In one example, the particulate metal has an atomic number greater than that of a metal component contained in the battery cell. For example, the particulate metal is at least one of tin and lead.

In one example, the thermally conductive resin is one or more of polyamide (PA), polycarbonate (PC), polyphenylene sulfide (PPS), polybutylene terephthalate (PBT), and polyetherimide (PEI).

In a specific example, the battery cell is a lithium secondary battery. For example, the battery cell is a pouch-type battery.

In addition, the present invention provides a method for inspecting the battery module described above.

In one embodiment, the battery module inspection method according to the present invention includes the step of detecting a dispersion degree of the thermally conductive resin by irradiating X-rays on the above-described battery module.

In one example, the step of detecting the degree of dispersion of the thermally conductive resin includes detecting particulate metal sprayed into the thermally conductive resin through X-ray irradiation, and calculating the degree of dispersion of the thermally conductive resin through dispersion of the detected particulate metal.

In a specific example, the step of detecting the degree of dispersion of the thermally conductive resin is performed by a dual energy X-ray device.

In a specific example, after the step of detecting the degree of dispersion of the thermally conductive resin, the method of inspecting a battery module according to the present invention further includes a step of determining whether the battery module is defective. The step of determining whether the battery module is defective is performed by dividing an inspection surface of the battery module to be inspected into two or more areas and by comparing a degree of dispersion of the detected particulate metal in one area with a degree of dispersion of the detected particulate metal in another area.

In another specific example, after the step of detecting the degree of dispersion of the thermally conductive resin, the method of inspecting a battery module according to the present invention further includes a step of determining whether the battery module is defective, wherein the step of determining whether the battery module is defective is performed by dividing an inspection surface of the battery module to be inspected into two or more areas and by comparing a degree of dispersion of the detected particulate metal in one area with a degree of dispersion of a preset particulate metal.

In one example, the step of detecting the degree of dispersion of the thermally conductive resin is performed by irradiating X-rays continuously or sequentially onto a plurality of battery modules.

In addition, the present invention provides an inspection system for the battery module described above.

In one example, a system for inspecting a battery module according to the present invention includes: two or more battery modules to be inspected; a transfer unit configured to continuously or sequentially transfer the battery modules; an X-ray inspection unit configured to irradiate X-rays on a battery module having reached a specific position during transport of the battery module and receive a result; and an output unit configured to output the result of X-ray irradiation on the battery module.

In a specific example, the X-ray inspection unit includes a dual energy X-ray device. In one example, the output unit further includes a data processing unit configured to divide an inspection surface of the battery module to be inspected into two or more areas, and calculate a dispersion degree of a detected particulate metal for each area.

Advantageous Effects

The battery module according to the present invention includes a thermally conductive resin in which particulate metal is dispersed, and through this, the degree of dispersion of the resin can be inspected in a non-destructive manner.

BRIEF DESCRIPTION OF THE DRAWINGS

FIG. 1 is a schematic diagram showing a cross-sectional structure of a battery module according to an embodiment of the present invention.

FIG. 2 is a schematic diagram showing a battery module inspection process according to another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

A battery module according to the present invention includes: at least one battery cell; a module case in which the battery cell is accommodated; and a thermally conductive resin accommodated in the module case to allow the battery cells to be partially impregnated. Further, the thermally conductive resin includes particulate metal dispersed in the resin matrix.

In the present invention, a battery pack is a generic term for a package in which one or two or more battery cells are combined. The battery pack is a concept including a battery module in which a plurality of battery cells are modularized, and in some cases, it should be construed to include referring to individual battery modules. The number of battery cells included in the battery pack may be variously applied according to the applied product or technical field, and may be, for example, in the range of 10 to 200.

The battery module according to the present invention includes a thermally conductive resin to prevent heat from accumulating inside the battery pack. The thermally conductive resin is positioned in contact with the battery cell, and serves to transmit heat generated from the battery cell to be discharged to the outside. Since the thermally conductive resin partially impregnates the battery cell, it also serves to fix the position of the battery cell.

In addition, the thermally conductive resin includes particulate metal dispersed in the resin matrix. The position of the metal particles can be detected when irradiated with X-rays. Therefore, in the present invention, by detecting the position or degree of dispersion of the particulate metal dispersed in the resin matrix, the position or degree of dispersion of the thermally conductive resin can be calculated.

In one embodiment, the particulate metal is a metal having an atomic number greater than that of a metal component contained in the battery cell. For example, the metal components contained in the lithium secondary battery are lithium, carbon, nickel, manganese, and aluminum, and among them, the metal with the largest atomic number is nickel. In the present invention, by using a metal having an atomic number larger than that of a metal component contained in a lithium secondary battery as a particulate metal dispersed in a resin matrix, detection efficiency during X-ray analysis can be improved. In a specific example, the particulate metal can be applied in various ways if its atomic number is larger than that of the metal component contained in the lithium secondary battery, but at least one of tin (Sn) and lead (Pb) may be used in terms of manufacturing cost or ease of securing materials. The content of the particulate metal is in the range of 0.5 to 10 parts by weight, specifically 1 to 10 parts by weight or 3 to 8 parts by weight, based on 100 parts by weight of the thermally conductive resin.

In another embodiment, the thermally conductive resin serves to transfer heat generated from the battery cell to be released to the outside, and includes at least one or more of polyamide (PA), polycarbonate (PC), polyphenylene sulfide (PPS), polybutylene terephthalate (PBT) and polyetherimide (PEI). For example, the thermally conductive resin is a polycarbonate (PC) resin.

Specifically, the thermally conductive resin may further include a conductive material. A conductive material is dispersed in a resin matrix, and one or more selected from the group consisting of graphite such as natural graphite or artificial graphite; carbon black, such as carbon black, acetylene black, ketjen black, channel black, furnace black, lamp black, and summer black; conductive fiber such as carbon fiber or metal fiber; metal powder such as carbon fluoride, aluminum or nickel powder; conductive whiskey such as zinc oxide or potassium titanate; conductive metal oxide such as titanium oxide; and polyphenylene derivatives, etc., may be used as the conductive material. The content of the conductive material is in the range of 1 to 40 parts by weight based on 100 parts by weight of the thermally conductive resin, and specifically in the range of 5 to 30 parts by weight or 10 to 30 parts by weight. In one embodiment, the thermally conductive resin has a structure in which 30 parts by weight of graphite particles are mixed with respect to 100 parts by weight of the resin.

In one embodiment, the thermally conductive resin includes 100 parts by weight of a resin, 1 to 40 parts by weight of a conductive material, and 0.5 to 10 parts by weight of a particulate metal. In a more specific embodiment, the thermally conductive resin includes 100 parts by weight of a resin, 10 to 40 parts by weight of a conductive material, and 3 to 10 parts by weight of a particulate metal.

The battery module according to the present invention includes a structure in which one or two or more battery cells are assembled. The battery cell includes an electrode assembly including a positive electrode, a negative electrode, and a separator interposed between the positive electrode and the negative electrode; a non-aqueous electrolyte impregnating the electrode assembly; and a battery case containing the electrode assembly and the non-aqueous electrolyte. In a specific embodiment, the battery cell is a lithium secondary battery. In addition, the battery cell is a pouch-type battery. Since the pouch-type battery is formed by using a pouch exterior material composed of a multilayer film including a metal layer (foil) and a synthetic resin layer coated on the upper and lower surfaces of the metal layer, the weight of the battery can be remarkably reduced compared to the cylindrical or square shape using metal cans, which makes it possible for the battery to be lightened and changed into various forms. For example, the battery cell is a pouch-type lithium secondary battery.

The lithium secondary battery is a generic term for a case containing lithium in a secondary battery, and specifically includes a positive electrode, a negative electrode, and a separator interposed between the positive electrode and the negative electrode.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0≤y<1)$, $Li_xNi_{1-y}Mn_yO_2(0.5<x<1.3, O≤y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4$ $(0.5<x<1.3, 0<z<2)$, $Li_xCoPO_4(0.5<x<1.3)$ and $Li_xFePO_4$ $(0.5<x<1.3)$, and the lithium-containing transition metal oxide may be coated with a metal or metal oxide such as aluminum (Al). Further, in addition to the lithium-containing transition metal oxide, one or more of sulfide, selenide, and halide may be used.

The positive electrode active material may be included in the range of 90 to 99 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric. The structure of the nonwoven fabric may be a spunbond nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

The electrolyte solution may contain an organic solvent and an electrolyte salt, and the electrolyte salt is a lithium salt. Those conventionally used in the electrolyte solution for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the electrolyte solution described above, those conventionally used in electrolyte solutions for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof. These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, γ-butyrolactone, γ-valerolactone, and γ-caprolactone, or a mixture of two or more of them, but the present invention is not limited thereto.

The injection of the non-aqueous electrolyte may be performed at an appropriate step in the manufacturing process of the battery cell, depending on the manufacturing process and required physical properties of the final product. That is, it can be applied before battery cell assembly or at the final stage of battery cell assembly.

The battery module according to the present invention can be applied in various forms or capacities. For example, the battery module can be applied to a vehicle or a large-capacity energy storage device. The battery module according to the present invention includes a thermally conductive resin therein, so that heat generated from the battery cell can be effectively discharged to the outside. In particular, it is possible to effectively detect the dispersion form of the thermally conductive resin and to inspect whether there is a defect in a non-destructive way. That is, the battery module according to the present invention can check the dispersion form of the thermally conductive resin only by a simple process of X-ray irradiation, thereby reducing the cost of inspection.

In addition, the present invention provides a method for inspecting the battery module described above. In one embodiment, the battery module inspection method according to the present invention includes the step of detecting a dispersion degree of the thermally conductive resin by irradiating X-rays on the battery module. The battery module is as described above.

In the present invention, a battery module to be inspected includes a thermally conductive resin to prevent heat from accumulating therein. The thermally conductive resin is positioned in contact with the battery cell, and serves to transmit heat generated from the battery cell to be discharged to the outside. In addition, the thermally conductive resin includes particulate metal dispersed in the resin matrix. The position of the metal particles can be detected when irradiated with X-rays.

In one example, in the method of inspecting a battery module according to the present invention, the step of detecting the degree of dispersion of the thermally conductive resin includes detecting particulate metal sprayed into the thermally conductive resin through X-ray irradiation, and calculating the degree of dispersion of the thermally conductive resin through dispersion of the detected particulate metal. The particulate metal is uniformly dispersed in the thermally conductive resin. Therefore, it is possible to estimate the distribution of the thermally conductive resin by detecting the position or dispersion of the particulate metal. As X-rays irradiated to the battery module collide with the particulate metal dispersed in the resin matrix, the transmittance becomes different from that of other areas. In one embodiment, the particulate metal is a metal having an atomic number greater than that of a metal component contained in the battery cell. Through this, a difference occurs in X-ray transmittance compared to other areas inside the secondary battery, and detection efficiency may be increased. In a specific example, the particulate metal includes at least one of tin (Sn) and lead (Pb).

In another embodiment, the step of detecting the degree of dispersion of the thermally conductive resin may be performed by a dual energy X-ray device. Specifically, the dual energy X-ray device is a dual energy X-ray absorptiometry (DXA). In the dual energy X-ray absorptiometry (DXA), two X-ray beams having different energy levels are irradiated onto an object. The result of the irradiated X-ray is obtained from the absorption or opacity of each beam according to the density, etc. of the object. The dual energy X-ray absorptiometry (DXA) implements higher resolution than conventional X-rays, and can significantly improve analysis precision.

In a specific embodiment, the present invention further includes the step of determining whether the battery module is defective after the step of detecting the degree of dispersion of the thermally conductive resin. Herein, the step of determining whether the battery module is defective is performed by dividing an inspection surface of the battery module to be inspected into two or more areas and by comparing a degree of dispersion of the detected particulate metal in one area with a degree of dispersion of the detected particulate metal in another area. Specifically, determining whether the battery module is defective includes determining whether the thermally conductive resin contained in the battery module is evenly dispersed. The thermally conductive resin is for heat dissipation of the battery cell, and uniform heat dissipation for the battery cells accommodated in the battery module is possible only when the thermally conductive resin is evenly dispersed on one surface of the battery module. Specifically, when the step of determining whether the battery module is defective is performed, the inspection surface of the battery module is divided into a plurality of areas, and it is checked whether the thermally conductive resin is evenly dispersed in each area. For example, after equally dividing the inspection surface of the battery module to be inspected into 6 to 25 areas, it is possible to determine whether the battery module is defective by comparing the distribution amount of the thermally conductive resin for each area.

In another specific embodiment, the present invention further includes the step of determining whether the battery module is defective after the step of detecting the degree of dispersion of the thermally conductive resin. Herein, the step of determining whether the battery module is defective is performed by dividing an inspection surface of the battery module to be inspected into two or more areas and by comparing a degree of dispersion of the detected particulate metal in one area with a degree of dispersion of a preset particulate metal. For example, after equally dividing the inspection surface of the battery module to be inspected into 16 areas, it is possible to determine whether the battery module is defective by comparing the distribution amount of the thermally conductive resin for each area with a preset reference value.

In one embodiment, the step of detecting the degree of dispersion of the thermally conductive resin of the present invention is performed by continuously or sequentially irradiating X-rays on a plurality of battery modules. The present invention can increase inspection efficiency and reduce process steps by irradiating X-rays on a path through which the battery module is transferred along the transfer means.

In addition, the present invention provides an inspection system for the battery module described above.

In one example, a system for inspecting a battery module according to the present invention includes: two or more battery modules to be inspected; a transfer unit configured to continuously or sequentially transfer the battery modules; an X-ray inspection unit configured to irradiate X-rays on a battery module having reached a specific position during transport of the battery module and receive a result; and an output unit configured to output the result of X-ray irradiation on the battery module. In the battery module manufacturing line, the assembled battery modules are moved to the next process step along the transfer means. In the present invention, by installing the X-ray inspection unit on the path through which the battery module is transported along the transfer means, there is no need to stop the manufacturing line or form a separate process line for the battery module inspection.

In one embodiment, the x-ray inspection unit includes a dual energy X-ray device. Specifically, the dual energy X-ray device is a Dual Energy X-ray Absorptiometry (DXA), and implements a higher resolution than conventional X-ray irradiation equipment, and can significantly improve analysis precision.

In one example, the output unit further includes a data processing unit configured to divide an inspection surface of the battery module to be inspected into two or more areas, and calculate a dispersion degree of a detected particulate metal for each area. For example, after equally dividing the inspection surface of the battery module to be inspected into 9 to 16 areas, it is possible to determine whether the battery module is defective by comparing the distribution amount of the thermally conductive resin for each area. In this case, by including a data processing unit that calculates the detected particulate metal for each area, faster and more accurate inspection is possible.

Hereinafter, the present invention will be described in more detail through examples and drawings. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First Embodiment

FIG. 1 is a cross-sectional view schematically showing the structure of a battery module according to an embodiment of the present invention. Referring to FIG. 1, the battery module 100 has a form in which a plurality of unit battery cells 110 are assembled and accommodated. A thermally conductive resin 120 is positioned in the battery module 100 so that some of the unit battery cells 110 are impregnated. The thermally conductive resin 120 is formed of a polycarbonate resin, and graphite particles and tin (Sn) particles are dispersed in a resin matrix. Specifically, the thermally conductive resin 120 is a composition including 100 parts by weight of resin, 30 parts by weight of graphite particles, and 5 parts by weight of tin particles.

During the charging and discharging process, heat is generated in the unit battery cells 110, and the generated heat is discharged through the thermally conductive resin 120. Accordingly, the thermally conductive resin 120 should be evenly distributed on one surface of the battery module 100 to achieve uniform heat dissipation for the unit battery cells 110.

In addition, the thermally conductive resin 120 is formed of a polycarbonate resin, and tin (Sn) particles are dispersed in a resin matrix. It is not easy to check whether the thermally conductive resin 120 is dispersed in the battery module 100 on which the packaging operation has been completed. Conventionally, expensive CT imaging equipment has to be introduced to photograph the battery module 100, or the assembled battery module 100 should be disassembled and checked again. However, according to these conventional technologies, equipment is expensive or a destructive inspection method is used. As such, process cost increases and efficiency is not good. In the present invention, by providing the thermally conductive resin 120 in which tin (Sn) particles are dispersed in a resin matrix, it is possible to check whether the thermally conductive resin is dispersed in a non-destructive manner through relatively inexpensive X-ray irradiation equipment.

Second Embodiment

In another embodiment, the battery module 100 is provided with a thermally conductive resin 120 in which lead (Pb) particles are dispersed in a resin matrix. Lead (Pb) has a relatively large atomic number, which confirms that the detection resolution of metal particles increases when the X-ray irradiation method is applied. However, as lead (Pb) is applied, the weight of the battery module 100 slightly increases.

Third Embodiment

FIG. 2 is a schematic diagram showing an inspection process for a battery module according to an embodiment of the present invention. Referring to FIG. 2, the assembled battery module 100 is sequentially transferred by the conveyor belt 200. By placing a dual energy X-ray device on the transfer path, the battery module 100 is inspected during transport. Specifically, X-rays are irradiated on the battery module 100 transferred by the conveyor belt 200 through a dual energy X-ray device, and the result is checked through the display device 300. If necessary, when outputting the inspection result, the display device 300 divides the screen into 16 areas, and detects whether or not there is a defect by comparing the inspection result for each area with a reference value.

DESCRIPTION OF REFERENCE NUMERALS

100: battery module
110: unit battery cell
120: thermally conductive resin
121: detected metal particle
200: conveyor belt
300: display device

The invention claimed is:

1. A method of inspecting a battery module, comprising detecting a degree of dispersion of a thermally conductive resin by irradiating X-rays on the battery module,
wherein the battery module comprises:
at least one battery cell;
a module case in which the battery cell is accommodated; and
the thermally conductive resin accommodated in the module case to allow the battery cells to be partially impregnated,
wherein the thermally conductive resin contains a particulate metal dispersed in a resin matrix, and
wherein the detecting the degree of dispersion of the thermally conductive resin includes detecting the particulate metal dispersed in the thermally conductive resin through the X-ray irradiation, and calculating the degree of dispersion of the thermally conductive resin through dispersion of the detected particulate metal.

2. The method of claim 1, wherein the detecting the degree of dispersion of the thermally conductive resin is performed by a dual energy X-ray device.

3. The method of claim 1, after the detecting the degree of dispersion of the thermally conductive resin, further comprising determining whether the battery module is defective by dividing an inspection surface of the battery module to be inspected into two or more areas and comparing a degree of dispersion of the detected particulate metal in one area with a degree of dispersion of the detected particulate metal in another area.

4. The method of claim 1, after the detecting the degree of dispersion of the thermally conductive resin, further comprising determining whether the battery module is defective by dividing an inspection surface of the battery module to be inspected into two or more areas and comparing a degree of dispersion of the detected particulate metal in one area with a degree of dispersion of a preset particulate metal.

5. The method of claim 1, wherein the detecting the degree of dispersion of the thermally conductive resin is performed by the irradiating X-rays continuously or sequentially onto a plurality of battery modules.

6. The method of claim 1, wherein the particulate metal has an atomic number greater than an atomic number of a metal component contained in the battery cell.

7. The method of claim 1, wherein the particulate metal comprises at least one of tin or lead.

8. The method of claim 1, wherein the thermally conductive resin comprises one or more of polyamide (PA), polycarbonate (PC), polyphenylene sulfide (PPS), polybutylene terephthalate (PBT), or polyetherimide (PEI).

9. The method of claim 1, wherein the battery cell is a lithium secondary battery.

10. The method of claim 1, wherein the battery cell is a pouch-type battery.

11. A system for inspecting a battery module, comprising:
two or more of the battery modules prepared by the method according to claim 1 to be inspected;
a transfer unit configured to continuously or sequentially transfer the battery modules;
an X-ray inspection unit configured to irradiate X-rays on the battery module having reached a specific position during transport of the battery module and receive a result; and
an output unit configured to output the result of X-ray irradiation on the battery module.

12. The system of claim 11, wherein the X-ray inspection unit includes a dual energy X-ray device.

13. The system of claim 11, wherein the output unit further comprises a data processing unit configured to divide an inspection surface of the battery module to be inspected into two or more areas, and calculate a dispersion degree of a detected particulate metal for each area.

* * * * *